Feb. 13, 1951        M. KER        2,541,820
VOLTAGE REGULATOR
Filed Nov. 12, 1946
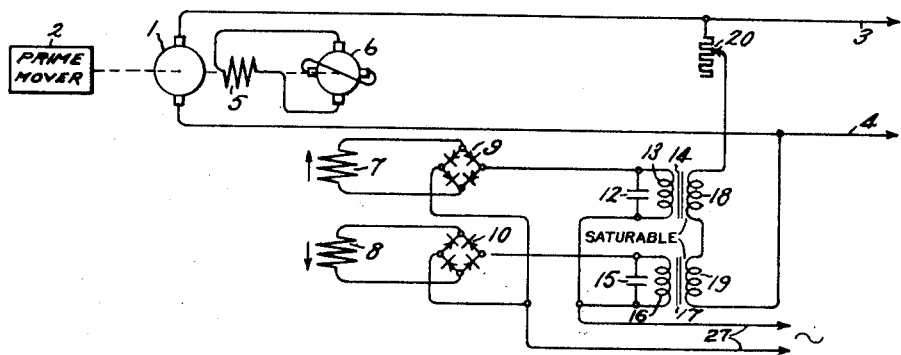
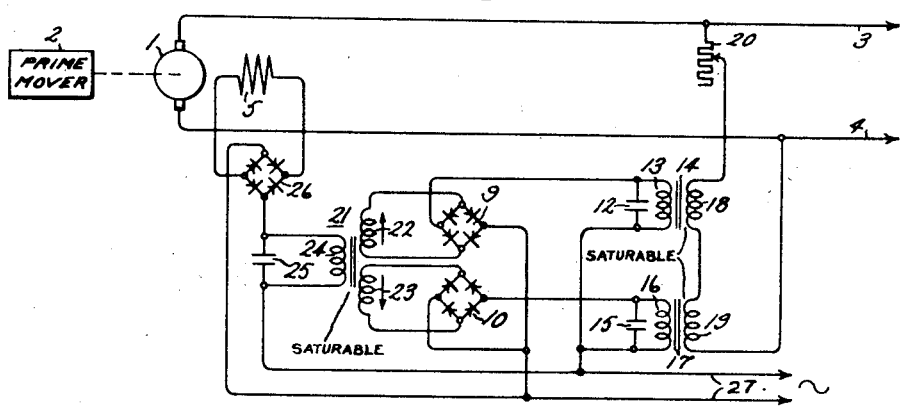
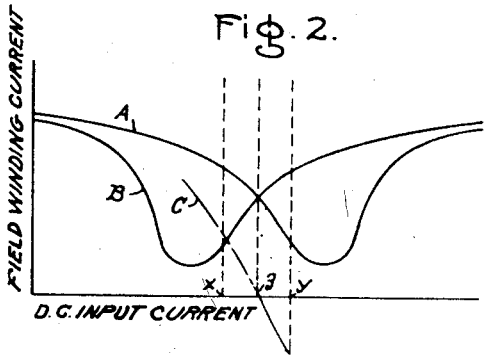
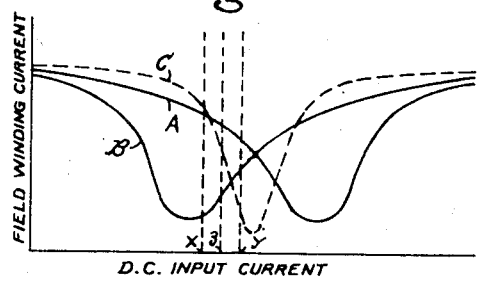
Inventor:
Montgomery Ker,
by *Prowell S. Mack*
His Attorney.

Patented Feb. 13, 1951

2,541,820

UNITED STATES PATENT OFFICE 2,541,820

VOLTAGE REGULATOR

Montgomery Ker, Scotia, N. Y., assignor to General Electric Company, a corporation of New York Application November 12, 1946, Serial No. 709,391

14 Claims. (Cl. 322—28)

1

My invention relates to voltage regulators and particularly to automatic voltage regulating circuits for dynamo-electric machines.

It has been well known for some time that a nonlinear relationship of output energy to input energy may be obtained by the use of electrical circuits employing capacitance and inductance in parallel circuit relationship. A number of applications of this phenomenon are shown in U. S. Patent No. 2,040,763, issued May 12, 1936, upon an application of C. M. Summers and assigned to the same assignee as the present invention. This characteristic is well adapted for use in voltage regulating systems where it is desirable to produce a relatively large change in the regulating or control quantity in response to a relatively small variation in the voltage to be controlled. In this manner the parallel circuit combination of inductance and capacitance acts in an amplifying sense and is well suited for use in controlling the output voltage of dynamo-electric machines, which value usually must be held within a close range of regulation.

It is, therefore, an object of my invention to provide improved voltage regulating means for dynamo-electric machines.

It is an other object of this invention to provide an improved voltage regulator that is simple, automatic in operation, and has no moving parts.

It is a further object of my invention to provide an improved voltage regulating circuit of the static type possessing a relatively high degree of sensitivity and response.

My invention will be better understood from the following description taken in connection with the accompanying drawing, and its scope will be pointed out in the appended claims.

In the drawing, Fig. 1 is a diagrammatic representation of one embodiment of my invention in which the voltage regulating circuit is applied to output voltage control of electric translating apparatus as a dynamo-electric machine; Fig. 2 shows performance curves illustrating the operating characteristics of the circuit shown in Fig. 1; Fig. 3 is an alternative embodiment of my invention also showing the voltage regulating circuit as applied to output voltage control of a dynamo-electric machine and eliminating the need for a dynamo-electric exciter; and Fig. 4 illustrates the operating characteristics of the system as shown in Fig. 3.

In accordance with my invention I have provided a plurality of electroresponsive circuit elements including saturable reactors having their alternating current secondary windings in parallel

2 relationship with capacitors. Where the control quantity, or D.-C. saturating current in the reactor primary winding is varied in a parallel circuit of this type, the impedance of the parallel combination of capacitance and reactance is varied nonlinearly due to circuit resonance, rising to a maximum corresponding to a certain degree of saturation, and then reducing again as the saturation is progressively increased. By adjusting the values of capacitance in the parallel circuit combination, this maximum peak value of impedance may be shifted with respect to the saturating current so that for two such devices connected to have the saturating windings energized by the same control current, the peak values of impedance will occur at different values of current, and at some point lying between the two peak values, the impedance characteristic curves will intersect, thus providing an ideal regulating point. Since the slope of the curves at this intersection is relatively great, high amplification will be obtained due to the disproportionately greater change in impedance resulting from a relatively small change in saturating current.

Referring now to Fig. 1, I have shown this principle applied to the regulation of a direct current dynamo-electric machine 1 arranged to be driven by any suitable form of prime mover 2 and connected to supply direct current energy to the main load conductors 3 and 4 which may be connected to any desired direct current load (not shown). While the system is shown as applied to a direct current machine, it will be obvious that it is equally applicable to alternating current dynamo-electric machines as well, provided rectified alternating current is supplied to the direct current saturating winding of the saturable reactors. Direct current for energizing the field winding 5 of the generator 1 is supplied from a direct current exciter 6 which I have chosen to illustrate, for the sake of simplicity, as being directly mechanically connected to the shaft of the main generator 1 and the prime mover. Because of the increased sensitivity and high speed of response of the armature reaction excited direct axis compensated type of dynamo-electric machine, I have illustrated the exciter 6 as being of this type. However, it will be understood that any conventional direct current exciter may be employed for the same application with possibly some sacrifice in sensitivity and speed of response. The output of the exciter 6 is controlled by means of a pair of control field windings 7 and 8 disposed on the frame of the exciter 6 and arranged to be energized with opposite polarity for purposes of providing a sensitive buck and boost exciting action for regulating the output of the exciter 6.

Direct current energy for the energization of control field windings 7 and 8 is supplied from the alternating current lines 27 from an alternating current supply source (not shown) through the rectifiers 9 and 10, respectively, and in series with each rectifier is placed the parallel non-linear combination of inductance and capacitance. For example, the alternating current input to the rectifier 9 is varied by the change in impedance of this alternating current circuit due to the change in impedance of the parallel combination of the capacitor 12 and winding 13 which forms the output winding of the saturable core reactor 14. A similar arrangement is provided for energizing control field winding 8, wherein the alternating current energy input to the rectifier 10 is varied by means of variations in impedance of the parallel circuit consisting of the capacitor 15 in parallel with the alternating current winding 16 of the saturable core reactor 17. The direct current saturating windings 18 and 19 of the reactors 14 and 17, respectively, are connected in series and also in series with the voltage level adjusting rheostat 20 across the main output conductors 3 and 4 of the generator 1, the output voltage of which is to be regulated.

It should also be pointed out here that the values of capacitance of the capacitors 12 and 15 are purposely selected to be unequal, and the values are chosen such that the regulating point, shown at z on Fig. 2, will occur at or near the desired output voltage of the generator 1.

The operation of the system as thus far described is best explained by reference to Fig. 2 in which I have shown the current in the field windings 7 and 8, which is also proportional to the input current to the rectifiers 9 and 10, as curves A and B respectively, plotted against values of direct current input to the saturable reactors 14 and 17. Thus curve A is representative of the current flowing in the control field winding 7 in response to variations in direct current input to the saturable reactor 14, and curve B is representative of current flowing in the control field winding 8 in response to the same variations in direct current flowing in the saturating winding of the reactor 17. In this connection it should be remembered that since control field windings 7 and 8 are arranged to be energized to produce fluxes of opposite polarity, the output current, as represented by curves A and B, must be considered as being of opposite polarity in order to appreciate that the net change in exciter flux varies disproportionately from positive to negative polarity with an increase in direct current input to the saturating windings of the reactors 18 and 19. The dotted line curve C represents the net flux available for excitation for energization of the exciter 6 and is obtained by adding the corresponding values of output current, as shown in curves A and B, taking into consideration that they are of opposite polarity. Thus it will be seen that the steep slope of the curve C in the range between the points x and y corresponds to an ideal operating range for regulation of the exciter and, in turn, for close and rapid control of the main generator 1. If the point z is assumed to be the saturating current value corresponding to the nominal rated voltage of the generator 1, then it will be seen from Fig. 2 that any change in generator voltage will produce a proportional change in direct current input to the saturating windings 18 and 19, with a consequent greater change in resultant exciting flux and in the proper direction to restore generator voltage to the normal rated value. I have found that with proper selection of circuit constants, an amplification ratio of output current to input saturating current as great as 4 to 1 may be obtained with the system of Fig. 1.

In Fig. 3 I have shown an alternative circuit arrangement embodying the same principle as previously described in connection with Fig. 1, and it should be noted that the circuit of Fig. 3 eliminates the use of the exciter 6 and is a completely static regulating system as no moving elements are employed. The same reference numerals have been used to indicate identical parts in Fig. 1 and in Fig. 3. The control exciter 6 and its buck and boost windings 7 and 8, respectively, have been replaced in Fig. 3 with a saturable core reactor 21 having a pair of direct current saturating windings 22 and 23 which are energized with direct current of opposite polarity from the rectifiers 9 and 10 respectively, said rectifiers being supplied with alternating current from lines 27, said lines connecting to an alternating current source (not shown). The output winding 24 of the saturable reactor 21 is connected in parallel with the capacitor 25 and the combination is then connected in series circuit relationship with the full wave rectifier bridge 26 and with the source of alternating current energy as shown. The D.-C. output of the rectifier bridge 26 is then supplied to the field winding 5 of the main generator and is effective to vary field excitation to maintain constant voltage across the line conductors 3 and 4.

In operation the system of Fig. 3 is very similar to that of Fig. 1 and is best explained by reference to the performance characteristics shown in Fig. 4. Curves A and B of Fig. 4 represent the direct current flowing in the saturating windings 22 and 23 respectively, and curve C represents the current flowing in the input and also output sides of the rectifier bridge 26. Thus it will be seen that the saturable reactor 21 and parallel capacitor 25 operate essentially in the same manner as the buck and boost field windings 7 and 8 and produce a varying current for energizing the main generator field 5, responsive but disproportional to the value of the saturating current flowing in the windings 18 and 19 of the saturable reactors 14 and 17 respectively. Since the respective reactor saturating fluxes produced by windings 22 and 23 are effective only to cause an increase or decrease in the impedance of the reactor 21, the result will be a V-curve as shown by curve C on Fig. 4. It will be seen that there can be no actual effective reversal of current and flux polarity in the field winding 5 as there is with the buck and boost field windings of Fig. 1; hence, it is necessary to select the operating range for voltage regulation on the downward sloping portion of the curve C, preferably between the points x and y as shown in Fig. 4. The point z representing the midpoint of this slope is selected to be the value of saturating current corresponding to nominal rated voltage of the generator; hence, a decrease in generator voltage will cause a decrease in saturating current from the point z toward the point x, and the current in the field winding 5 will be disproportionately increased so as to restore generator voltage to the proper value. In the case where generator voltage rises above the corresponding value of saturating current at point z toward the point y, there will be a decrease in current in the field winding 5, thereby tending to restore generator voltage to the proper value.

The system of Fig. 3 thus operates in a similar manner to that of Fig. 1 and for certain applications where the main generator may be directly excited by the current supplied from a full wave bridge rectifier 26, such as for machines of smaller capacity, the system of Fig. 3 is advantageous in that it is completely automatic and requires no moving parts or adjustment once the system is set up and placed in operation. Other applications may be found in the use of this system for control of the firing reactors for power rectifiers, and also for speed control of direct current motors.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. A regulating system comprising, a load circuit, means for supplying voltage to said load circuit, said means being provided with a control winding, a source of alternating current energy supply, rectifying means connected across said alternating current supply for supplying variable current to said control winding, means for varying the energy supplied to said rectifying means by said alternating current including a plurality of variable impedance elements, said variable impedance elements including saturable reactors having their alternating current windings in parallel relationship with capacitors, a direct current saturating winding for each reactor and means for non-linearly varying the impedance of said impedance elements directly with variations in load circuit voltage.

2. In combination, a load circuit, means for supplying electric energy to said circuit, regulating means for varying the energization of said circuit by said supply means, said regulating means including a pair of rectifier elements differentially connected in parallel across a source of alternating current energy for said rectifiers, a resonant nonlinear circuit including saturable reactors each having an alternating current winding of parallel capacitance and inductance in series with the input circuit to each rectifier, a direct current saturating winding for each of said reactors, and means for varying the direct current saturating current in said nonlinear circuit responsive to variations in load circuit voltage.

3. In a regulating circuit for a dynamo-electric machine having a field winding, means for supplying varying amounts of energy to said field winding, a nonlinear voltage sensitive control circuit responsive to output voltage of said machine for varying the supply of energy to said field winding to maintain constant said machine voltage, said control circuit including a plurality of nonlinear inductive elements each having one winding thereof connected in parallel circuit relationship with a capacitor, a second direct current saturating winding on each of said inductive elements, and means for variably saturating said second windings with direct current responsive to machine output voltage for non-linearly varying the effective impedance of said parallel circuits due to circuit resonance.

4. A regulating circuit for a dynamo-electric machine having a field winding comprising, a direct current exciter for energizing said field winding, a pair of differentially acting control field windings for said exciter, means for energizing said control field windings in response to output voltage of said dynamo-electric machine to maintain constant said output voltage, said means including a pair of saturable reactors each having a primary and a secondary alternating current winding, a pair of rectifiers for energizing said control fields connected in series with said secondary windings and with a source of alternating current energy, a capacitor element shunted across each of said secondary windings, and means for varying the impedance of said saturable reactors by energizing said primary windings with direct current that varies directly with output voltage of said dynamo-electric machine.

5. A regulating circuit for a dynamo-electric machine having a field winding comprising, a direct current exciter for energizing said field winding, a pair of control fields for said exciter, means for oppositely varying the energization of said control fields in response to output voltage variations of said dynamo-electric machine to maintain said output voltage substantially constant, said means including a pair of saturable reactors each having a direct current primary and an alternating current secondary winding, a pair of rectifiers for energizing said control fields connected in series with said secondary windings and with a source of alternating current energy, and means for energizing said primary windings with direct current that varies directly with output voltage of said dynamo-electric machine.

6. A regulating circuit for a dynamo-electric machine comprising, a field winding for said machine, means for supplying energy to said field winding, a nonlinear voltage sensitive control circuit responsive to output voltage of said machine, said control circuit including a pair of nonlinear inductive elements each being connected in parallel relationship with a capacitor, a plurality of windings on each of said inductive elements, means for variably energizing one of said windings with direct current responsive to machine output voltage for varying the energy output of said inductive element, a third nonlinear element having input windings connected to be energized by the energy output of said inductive elements, and an output winding for said third nonlinear element, rectifying means in series with said output winding and with said energy supply means, said field winding being energized by the output of said rectifying means.

7. A voltage regulating system for a direct current generator having a field winding comprising, rectifier means for supplying energy to said field winding, a nonlinear voltage sensitive control circuit responsive to output voltage of said generator for varying the input to said rectifier means to maintain said generator voltage constant, said control circuit including a pair of saturable reactors each having a primary and a secondary alternating current winding, means for variably energizing said primary windings with direct current directly responsive to generator output voltage, and a third saturable reactor having a pair of primary windings and a secondary winding, said secondary winding being connected in series with said rectifier means and said primary windings arranged to be energized responsive to the output of said secondary windings of said first pair of saturable transformers.

8. A voltage regulating system for a direct current generator having a field winding comprising, a direct current exciter for energizing said field winding, a pair of differentially acting control field windings for said exciter, means for oppositely varying the energization of said control field windings in response to output voltage variations of said dynamo-electric machine to maintain said output voltage substantially constant, said means including a pair of rectifiers connected to supply energy to said control fields, a variable impedance element in series with the input to each rectifier and with a source of alternating current energy, and means for varying the effective impedance of said impedance elements in opposite senses in response to variations in the output voltage of said generator.

9. A voltage regulating system for a direct current generator having a field winding comprising, a direct current exciter for energizing said field winding, a pair of differentially acting control field windings for said exciter, means for variably energizing said control field windings in response to output voltage of said dynamo-electric machine to maintain constant said output voltage, said means including a pair of saturable reactors each having a first saturating winding connected in series with each other and across the output of said direct current generator, secondary alternating current windings for said reactors each having a capacitor in shunt relationship therewith, and a pair of rectifiers arranged to receive energy from said alternating current windings and to supply direct current energy to said control field windings.

10. In a regulating system for electric translating apparatus, means for varying an electrical output characteristic of said apparatus, means for controlling said output varying means comprising a pair of rectifiers having alternating current input and direct current output circuits and disposed with their output circuits in opposing relation, means connecting the input circuits of each of said rectifiers to a source of alternating current supply through separate saturable core variable impedance elements, and means responsive to the value of said output characteristic for varying the impedances of said elements non-linearly and non-coincidentally.

11. In a regulating system for electric translating apparatus, means for varying an electrical output characteristic of said apparatus, means for controlling said output varying means comprising a pair of rectifiers having alternating current input and direct current output circuits and disposed with their output circuits in opposing relation, means connecting the input circuits of each of said rectifiers to a source of alternating current supply through separate saturable core variable impedance elements, means responsive to the value of said output characteristic for varying each of said impedances non-linearly over a range providing a point of maximum impedance, and means for displacing said maximum impedance points within said range.

12. In a regulating system for a dynamoelectric machine, means for varying an electrical output characteristic of said machine, means for controlling said output varying means comprising a pair of rectifiers having alternating current input and direct current output circuits, said output circuits being differentially coupled, a pair of saturable core reactors having direct current and alternating current windings, means for supplying alternating current to each of said rectifiers through said alternating current windings respectively, means responsive to the value of said output characteristic for supplying varying saturating direct current to said direct current winding, and means responsive to said saturating current for non-linearly and non-coincidentally varying the impedance of said alternating current windings.

13. In a voltage regulating system for a dynamoelectric machine having a field winding, means for supplying energizing current to excite said field winding, means for varying said supply means to control the output voltage of said machine comprising a pair of rectifiers having their output circuits differentially arranged, a pair of saturable core reactors having direct current and alternating current windings, means for supplying alternating current to each of said rectifiers through said alternating current windings respectively, means responsive to the output voltage of said dynamoelectric machine for supplying a variable saturating direct current to said direct current windings, and means including a capacitance connected across each of said alternating current windings of said saturable reactors for non-linearly and non-coincidentally varying the impedance of said alternating current windings in response to variations of said saturating current.

14. In a voltage regulating system for a dynamoelectric machine having a field winding, means for supplying energizing direct current to excite said field winding, said means including a pair of rectifiers having their output circuits disposed in opposing relation, a pair of saturable reactors each having a primary direct current saturating winding and a secondary alternating current winding, said alternating current windings having similar electrical characteristics, a capacitor connected in parallel with each of said alternating current windings to form a parallel resonant circuit therewith, said capacitors being of unequal value thereby to render said parallel circuits resonant at different impedance values of said alternating current windings, means for supplying alternating current to each of said rectifiers through said alternating current windings respectively, and means responsive to the output voltage of said machine for supplying to said direct current saturating windings a saturating current varying in accordance with said voltage, thereby to vary the impedance of each said parallel circuit non-linearly and oppositely in response to opposite variations of said saturating current from a predetermined regulated value.

MONTGOMERY KER.

REFERENCES CITED

The following references are of record in the file of this patent:

UNITED STATES PATENTS

| Number | Name | Date |
| --- | --- | --- |
| 1,776,592 | MacDonald | Sept. 23, 1930 |
| 2,057,520 | Gulliksen | Oct. 13, 1936 |
| 2,407,476 | Crever | Sept. 10, 1946 |